(12) United States Patent
Cho et al.

(10) Patent No.: US 6,782,677 B2
(45) Date of Patent: Aug. 31, 2004

(54) TABLET DETECTING SYSTEM FOR MOLDING TABLET SUPPLYING APPARATUS

(75) Inventors: Kyoung-Rae Cho, Chungcheongnam-do (KR); Kyung-Soo Park, Chungcheongnam-do (KR); Ju-Hwan Choi, Kyungsangnam-do (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 10/407,842

(22) Filed: Apr. 4, 2003

(65) Prior Publication Data

US 2003/0213215 A1 Nov. 20, 2003

(30) Foreign Application Priority Data

Apr. 4, 2002 (KR) ........................................ 2002-18557

(51) Int. Cl.⁷ ................................................ B65B 1/30
(52) U.S. Cl. .......................... 53/499; 53/498; 53/560; 53/900; 33/501.6
(58) Field of Search .......................... 53/498, 499, 560, 53/554, 900, 246, 539, 503; 33/783, 501.6, 549, 555; 200/61.41, 61.42; 324/512, 719

(56) References Cited

FOREIGN PATENT DOCUMENTS

| JP | 07270128 | * | 3/1994 | ............ | B29C/45/02 |
| JP | 2003174050 | * | 12/2001 | ............ | H01L/21/56 |

* cited by examiner

*Primary Examiner*—Stephen F. Gerrity
*Assistant Examiner*—Thanh Truong
(74) *Attorney, Agent, or Firm*—Marger Johnson & McCollom, P.C.

(57) ABSTRACT

A tablet detecting system ascertains whether a tablet exists in a receiving hole of a loader unit used for a molding tablet supplying apparatus or, if exists, whether the tablet has a standard size, by using a mechanical contact manner. The tablet detecting system has a push rod, a contact head, an insulation plate, a conductive assembly and a control unit. The push rod is inserted into the receiving hole and moves upward just as high as the tablet. The contact head is formed on a top of the push rod and the insulation plate is located over the contact head. The conductive assembly is formed in the insulation plate and the control unit is electrically connected to the conductive assembly. When the tablet in the receiving hole has a standard size, the contact head mechanically touches the conductive assembly and gives electrical connection to the conductive assembly, and the control unit senses the electrical connection. The conductive assembly may be a pair of conductive pads formed separately on a bottom surface of the insulation plate, or a pair of plungers inserted into a pair of cylindrical bodies each formed in the insulation plate and spaced apart from each other.

7 Claims, 5 Drawing Sheets

TABLET DETECTING SYSTEM FOR MOLDING TABLET SUPPLYING APPARATUS

BACKGROUND OF THE INVENTION

This application relies for priority upon Korean Patent Application No. 2001-18557, filed on Apr. 4, 2002, the contents of which are herein incorporated by reference in their entirety.

1. Field of the Invention

The present invention relates to a semiconductor package manufacturing apparatus and, more particularly, to a tablet detecting system for a molding tablet supplying apparatus.

2. Description of the Related Art

Semiconductor products are manufactured in general through many processes, i.e., wafer fabrication, EDS (electrical die-sorting), package assembly and test processes. The package assembly process includes a wafer sawing process, a die attaching process, a wire bonding process, a molding process, and a lead trimming/forming process.

In the molding process, wire-bonded semiconductor chips are encapsulated with molding resin such as epoxy compound. The molding resin is supplied to a molding apparatus in the form of solid tablets. The tablets are heated, melted and injected into the mold dies of the molding apparatus, and then hardened to form a package body.

An automated apparatus supplies the molding tablets to the molding apparatus. A conventional tablet supplying apparatus is shown in FIG. 1. As shown in FIG. 1, the conventional tablet supplying apparatus 10 includes a storing unit 20, an aligning unit 30, a transfer unit 40 and a loader unit 50.

The storing unit 20 stores the tablets 12 and discharges the tablets 12 through an exit slide 22. Typically, the tablet 12 has a cylindrical shape. The aligning unit 30 arranges the tablets 12 in an upright posture. The tablet 12 discharged from the storing unit 20 drops to a conical plane 32 of the aligning unit 30. The peripheral edge of the conical plane 32 connects with a curved road 34a. The tablets 12 on the conical plane 32 gather around the peripheral edge of the conical plane 32 and then move along the curved road 34a by a vibrating act of the aligning unit 30. On the curved road 34a, a height sorter 36a and a diameter sorter 36b are positioned to sort out bigger tablets 12. That is, the sorters 36a and 36b stop tablets 12 larger than standard height and diameter. Only tablets 12 of standard size or smaller can move to a straight road 34b.

The transfer unit 40 transfers one by one the tablets 12 from the end of the straight road 34b to the loader unit 50. The transfer unit 40 has a transfer rod 42, an air cylinder 44 and a transfer plate 46. The transfer rod 42 has a grasp groove 42a and the transfer plate 46 has a drop hole 46a. After the tablet 12 discharged from the straight road 34b is caught in the grasp groove 42a, the air cylinder 44 pushes the transfer rod 42 toward the drop hole 46a. When the grasp groove 42a reaches the drop hole 46a, the tablet 12 in the grasp groove 42a falls through the drop hole 46a to the loader unit 50 under the transfer plate 46.

A loader block 51 of the loader unit 50 has a lateral hollow 51a and plural receiving holes 51b. A lifting plate 52 is placed in the lateral hollow 51a and plural lifting pins 53 are formed on the lifting plate 52. Each lifting pin 53 is inserted into the receiving hole 51b. The lifting plate 52 can move up and down by the rotation of a screw rod 55 driven by a motor 54. The tablet 12 supplied through the drop hole 46a stays in the receiving hole 51b, while the lifting pin 53 supports the bottom of the tablet 12. Thereafter, the loader unit 50 moves to the molding apparatus (not shown) and the lifting pin 53 pushes up the tablet 12 in the receiving hole 51b by the rising of the lifting plate 52.

As described above, tablets 12 exceeding the standard size are unacceptable and sorted out by both the height sorter 36a and the diameter sorter 36b. However, another unacceptable tablets 12 below the standard size pass through the sorters 36a and 36b. Unfortunately, when the smaller tablets 12 are used for the molding process, the package body is incompletely filled. In these situations, the package bodies include voids after cooling because the culls are thinner than the standard thickness. Additionally, poor packages formed from unacceptable tablets are more common in small packages like the ball grid array (BGA) packages.

For the above reasons, the conventional tablet supplying apparatus 10 further uses a tablet detecting system 60 to discover the existence of unacceptable tablets before supplying the tablets 12 to the molding apparatus. As illustrated in FIGS. 1 and 2, the conventional detecting system 60 includes movable rods 62 and a sensor 64. When the loader unit 50 is positioned under the detecting system 60, the movable rods 62 are inserted into the receiving holes 51b of the loader unit 50. The movable rods 62 can freely move up and down. As depicted in FIG. 2, if the tablet 12 exists in the receiving hole 51b, the movable rod 62 moves upward just as high as the tablet 12. Further, the sensor 64 senses the existence of the movable rod 62 at a position equivalent to the height of the standard-sized tablet 12. Therefore, if no tablet or a smaller tablet exists in the receiving hole 51b, the movable rod 62 does not reach the position of the sensor 64 and the tablets are determined to be unacceptable.

The conventional tablet detecting system has a difficulty in precisely distinguishing unacceptable tablets that are very similar in size to the standard tablets. Considering a tendency toward smaller packages, a minute difference in size of the tablet is becoming a more important factor in reliable molding process. Therefore, a precise detection system for ascertaining minute size differences of the tablets is required. Furthermore, a sensor of the conventional detecting system often operates erroneously due to impurities such as tablet particles.

SUMMARY OF THE INVENTION

The present invention provides a tablet detecting system, which can ascertain whether a tablet exists in a receiving hole of a loader unit used for a molding tablet supplying apparatus or, if exists, whether the tablet has a standard size, by using a mechanical contact manner.

The tablet detecting system of the present invention comprises a push rod, a contact head, an insulation plate, a conductive assembly and a control unit. The push rod is inserted into the receiving hole and moves upward just as high as the tablet. The contact head is formed on a top of the push rod and made of electrically conductive material. The insulation plate is located over the contact head. The conductive assembly is formed in the insulation plate and made of electrically conductive material. The control unit is electrically connected to the conductive assembly. In particular, when the tablet in the receiving hole has a standard size, the contact head mechanically touches the conductive assembly and gives electrical connection to the conductive assembly, and the control unit senses the electrical connection.

In the tablet detecting system of the present invention, the conductive assembly may include a pair of conductive pads formed separately on a bottom surface of the insulation plate. Alternatively, the conductive assembly may include a pair of cylindrical bodies each formed in the insulation plate and spaced apart from each other, a pair of plungers each inserted into the cylindrical body, and a pair of springs each interposed between the cylindrical body and the plunger so that the plunger protrudes downward from the insulation plate. The contact head may have a size enough to simultaneously touch the pair of conductive pads or the pair of plungers.

DETAILED DESCRIPTION OF THE INVENTION

The present invention will be now described more fully hereinafter with reference to accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. For purposes of illustration, some elements are exaggerated, outlined or omitted in drawings. Further, same reference numbers represent same elements.

Figure 1:
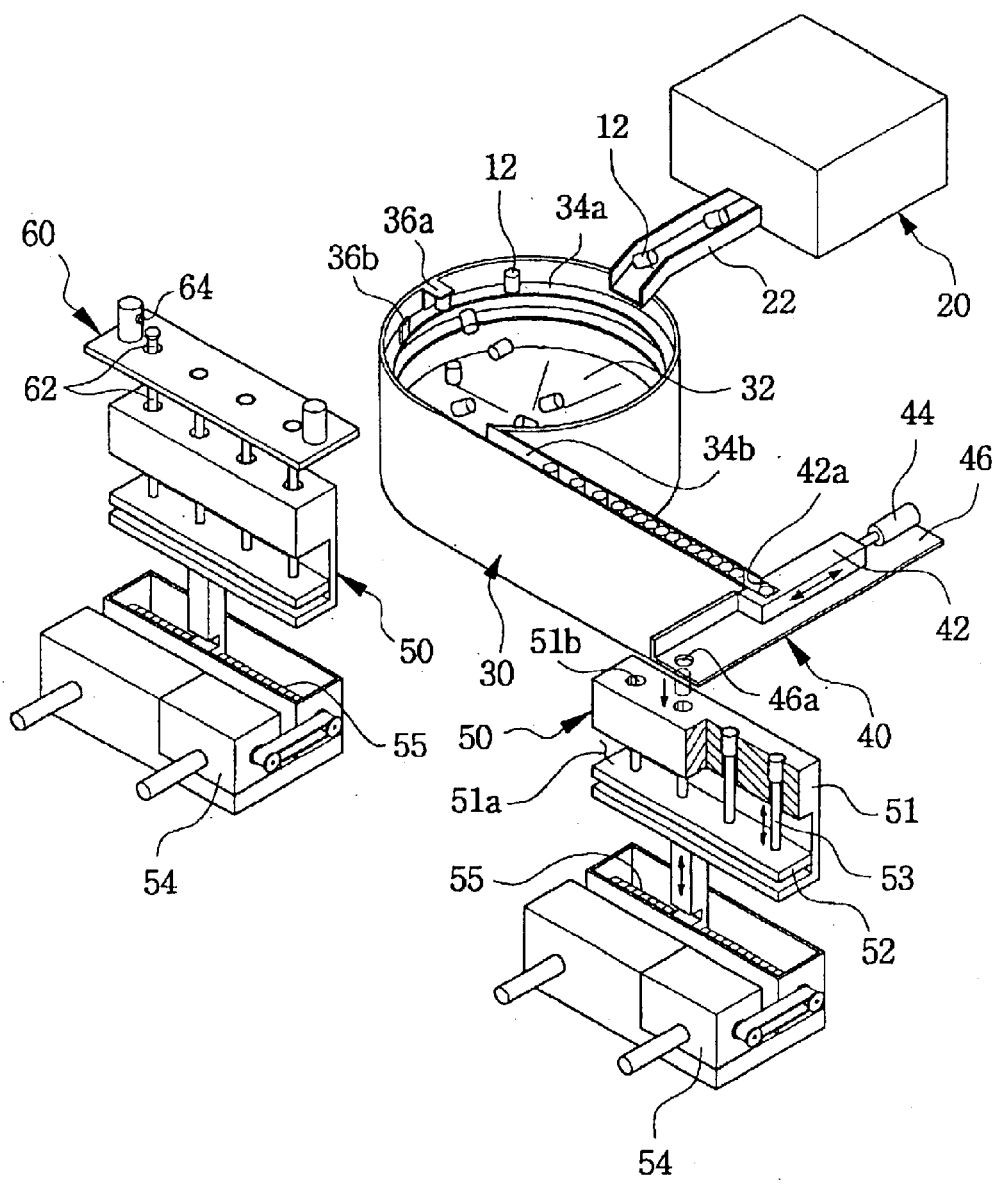
FIG. 1 is a perspective view showing a conventional molding tablet supplying apparatus.
Figure 2:
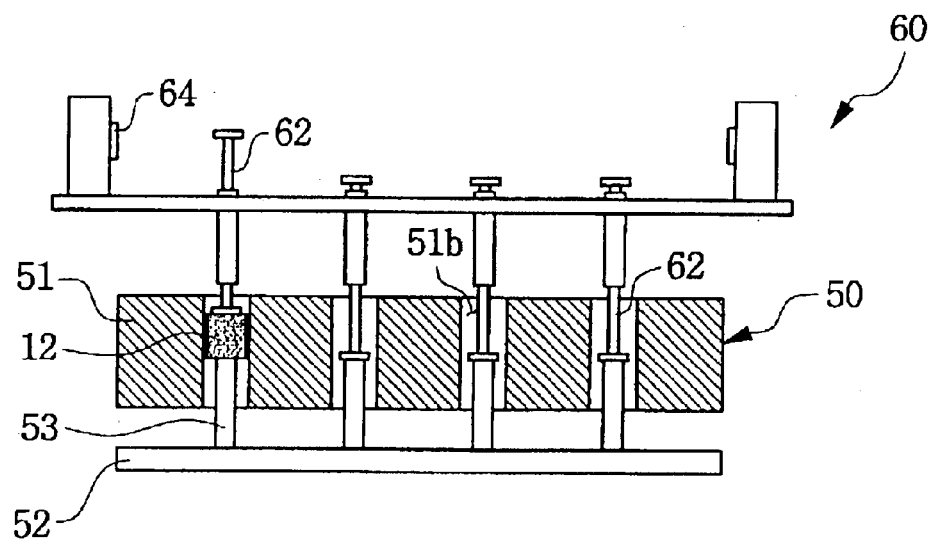
FIG. 2 is a sectional view showing a conventional tablet detecting system.
Figure 3:
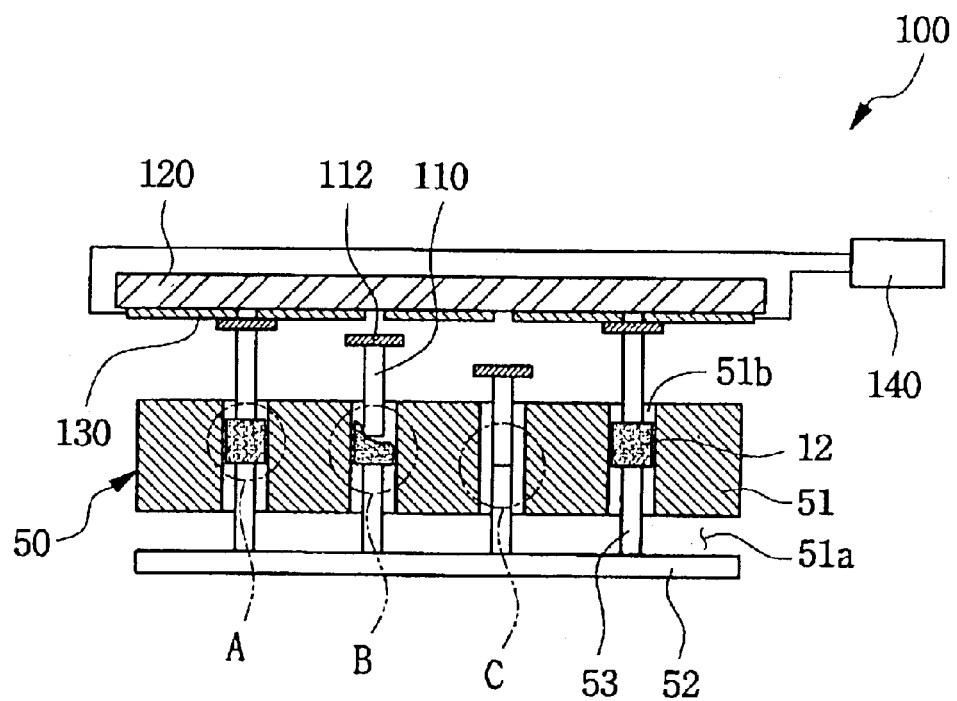
FIG. 3 is a sectional view showing a tablet detecting system according to one embodiment of the present invention.

FIG. 3 schematically shows, in a perspective view, a tablet detecting system 100 according to one embodiment of the present invention. Referring to FIG. 3, the tablet detecting system 100 is located above a loader unit 50 containing tablets 12 so as to ascertain whether the tablet 12 exists in a receiving hole 51b of the loader unit 50 or, if exists, whether the tablet 12 has a standard size. The loader unit 50 is the same one as aforementioned in the Related Art Section, so a detailed description thereof will be omitted. The detecting system 100 includes several push rods 110, an insulation plate 120 and several conductive pads 130.

Each push rod 110 is inserted into the receiving hole 51b and can freely move up and down. Each lifting pins 53, formed on the lifting plate 52 under the receiving holes 51b, is also inserted into the corresponding receiving hole 51b. Therefore, the lifting pin 53 supports the tablet 12 in the receiving hole 51b, and the push rod 110 is placed on the tablet 12. As will be described later, the push rod 110 can be movably formed in a support plate fixed to a frame. The insulation plate 120 is located over the push rods 110. The several conductive pads 130, made of electrically conductive material such as metal, are formed at regular intervals on the bottom surface of the insulation plate 120. A space between the adjacent conductive pads 130 corresponds to the position of each push rod 110. Among the conductive pads 130, both outermost pads are electrically connected to a control unit 140.

A contact head 112 is securely formed on the top of the push rod 110. The contact head 112 may be integrated with the push rod 110. The contact head 112 is made of electrically conductive material and has a size enough to simultaneously touch a pair of the pads 130. As indicated by the part 'A' of FIG. 3, if a tablet 12 having a standard size exists in the receiving hole 51b, the push rod 110 moves upward just as high as the tablet 12 and the contact head 112 touches a pair of pads 130. Therefore, electrical connection between the conductive pads 130, separated by spaces, is established by the contact head 112. Further, if all the receiving holes 51b contain the standard tablets 12, the contact heads 112 electrically connect all the conductive pads 130 and the control unit 140 senses the electrical connection.

On the other hand, if a tablet 12 below the standard size is contained in the receiving hole 51b as indicated by the part 'B', or if no tablet is in the receiving hole 51 as indicated by the part 'C', the contact head 112 does not reach the conductive pads 130. Therefore, the conductive pads 130 remain electrically disconnected to each other and the control unit 140 senses the electrical disconnection. To sense the electrical connection or disconnection between the conductive pads 130, the control unit 140 sends electric signals to one of both outermost pads 130 and receives the signals from the other. Thereafter, the control unit 140 judges from the sensing result whether unacceptable tablets are contained in the loader unit 50. As described hereinbefore, the tablet detecting system can precisely distinguish unacceptable tablets by using a mechanical contact manner.

Figure 4A:
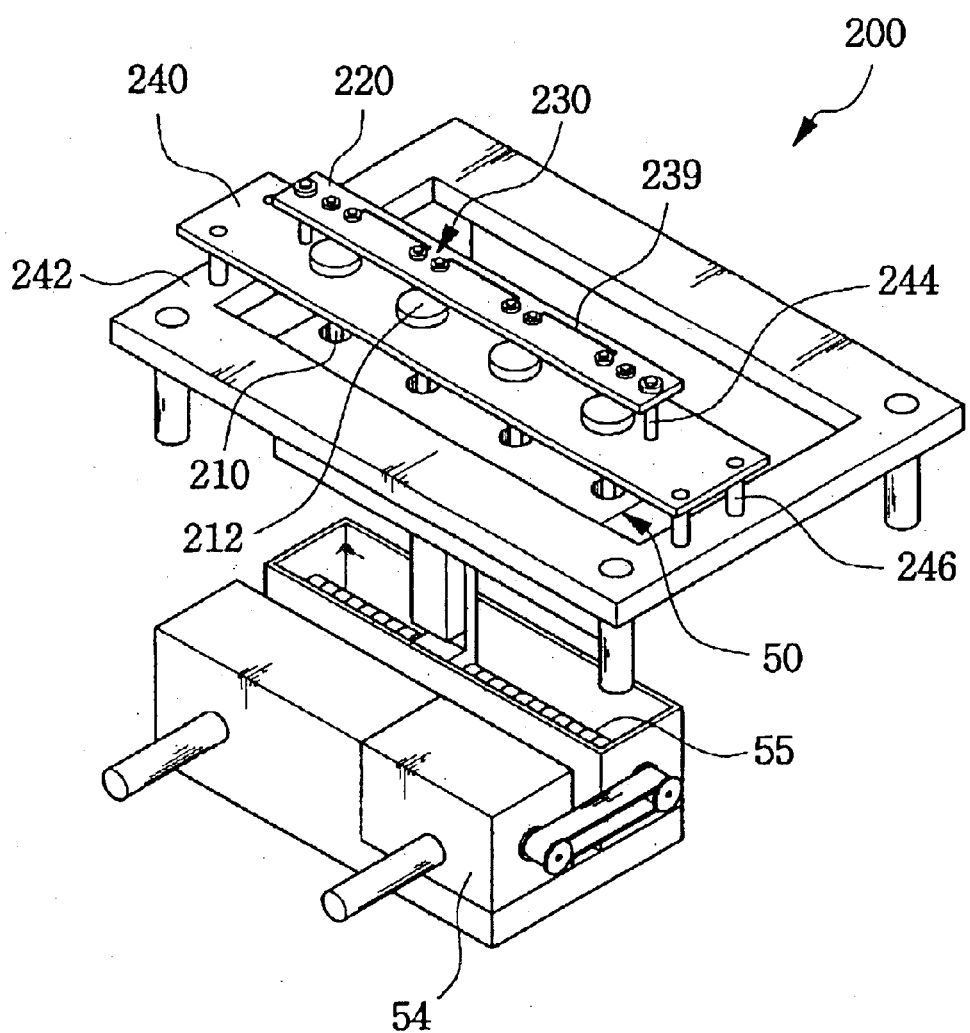
FIGS. 4A and 4B are a perspective view and a sectional view showing a tablet detecting system according to another embodiment of the present invention.
Figure 4B:
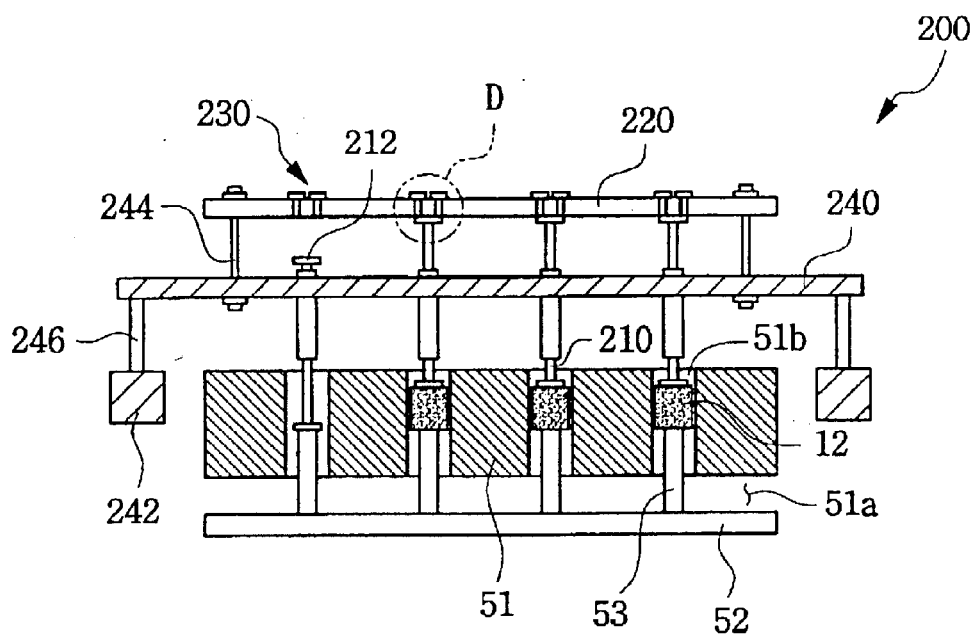

FIGS. 4A and 4B show, in a perspective view and a sectional view, a tablet detecting system 200 according to another embodiment of the present invention. Referring to FIGS. 4A and 4B, the tablet detecting system 200 of this embodiment is also located above the loader unit 50 and has several push rods 210, an insulation plate 220 and several conductive assemblies 230.

The push rods 210 are formed in a support plate 240 and can freely move up and down. The support plate 240 is fixed to a frame 242 through fasteners 246. Each push rod 210 is inserted into an upper part of the receiving hole 51b and each lifting pin 53 is inserted into a lower part of the receiving hole 51b. The insulation plate 220 is located over the push rods 210. The insulation plate 220 is fixed to the support plate 240 through another fasteners 244. The several conductive assemblies 230, made of electrically conductive material such as metal, are formed at regular intervals in the insulation plate 220. Each conductive assembly 230 corresponds to the position of each push rod 210. Among all the conductive assemblies 230, both outermost ones are electrically connected to a control unit (not shown).

Figure 5A:
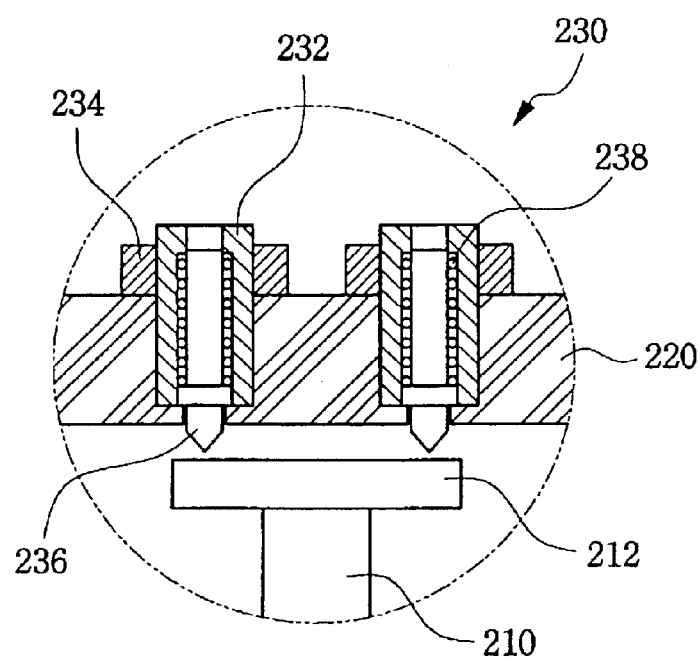
FIGS. 5A and 5B are partially enlarged sectional views of the part 'D' of FIG. 4B.
Figure 5B:
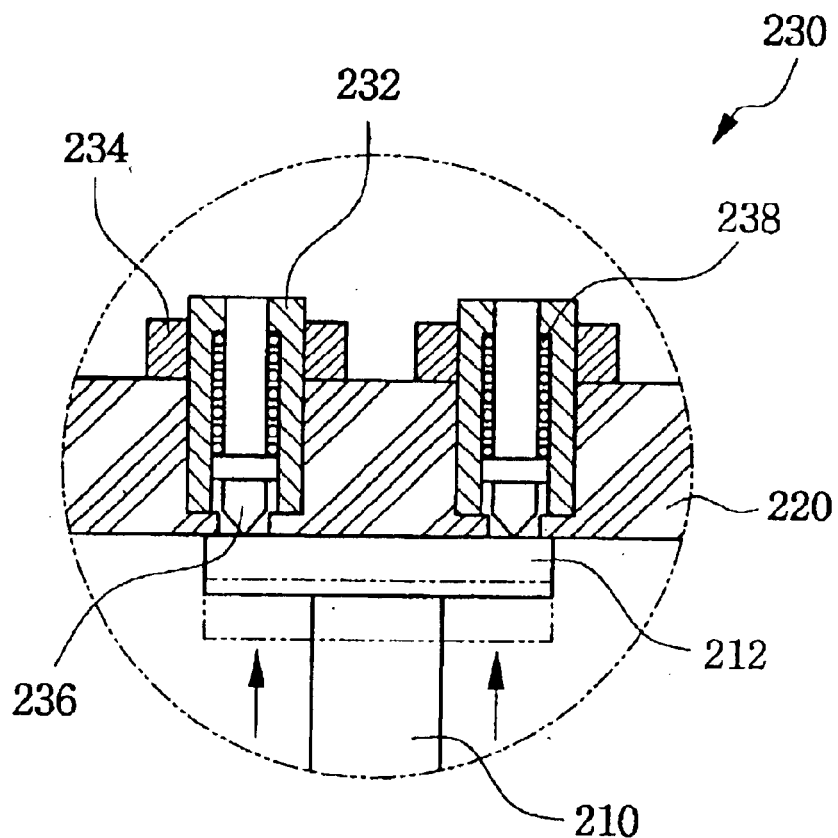

A detailed structure of the conductive assembly 230 is shown in FIGS. 5A and 5B that are partially enlarged sectional views of the part 'D' of FIG. 4B. Referring to FIGS. 5A and 5B, each conductive assembly 230 includes a pair of cylindrical bodies 232, a pair of nuts 234, and a pair of plungers 236. The cylindrical body 232 is inserted into a through hole in the insulation plate 220 and fastened with the nut 234. The plunger 236 is inserted into the cylindrical body 232 and caught on a lower projecting rim of the though hole not to be fell out. A spring 238 is interposed between the cylindrical body 232 and the plunger 236. When there is no external force except a resilient force of the spring 238, the plunger 236 protrudes downward from the insulation plate 220 by the force of the spring 238, as shown in FIG. 5A.

Referring to FIGS. 4A and 4B, together with FIGS. 5A and 5B, a contact head 212 is securely or integrally formed on the top of the push rod 210. The contact head 212 is made of electrically conductive material and has a size enough to simultaneously touch the pair of plungers 236 of the conductive assembly 230. As described in the previous embodiment, if a standard tablet 12 is in the receiving hole 51b, the push rod 210 moves upward just as high as the tablet 12. Then the contact head 212 pushes and touches the pair of plungers 236, as shown in FIG. 5B. In the pair of plungers 236, one plunger is spaced apart from the other. The pair of nuts 234 is the same. Therefore, when the contact head 212 does not touch the plungers 236 as shown in FIG. 5A, the plungers 236 in the conductive assembly 230 remain electrically disconnected to each other. On the other hand, when the contact head 212 touches the plungers 236 as shown in FIG. 5B, the plungers 236 are electrically connected to each other through the contact head 212. As a result, in a single conductive assembly 230, electrical connection is made between the cylindrical bodies 232 and between the nuts 234 in the conductive assembly 230 because the plunger 236, the body 232 and the nut 234 are already in contact with each other.

Figure 6:
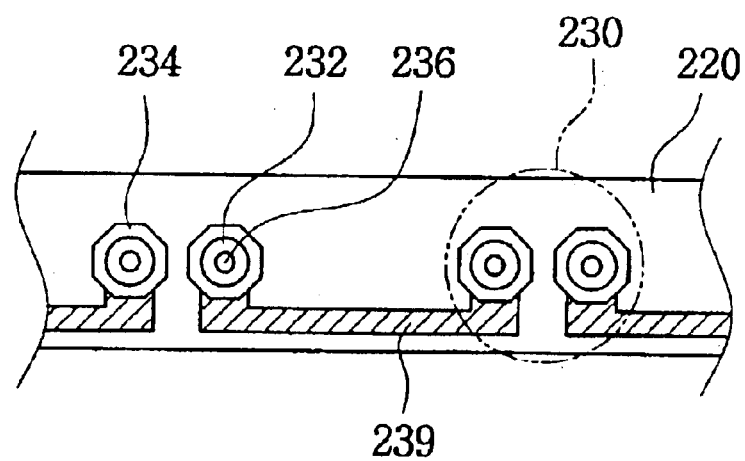
FIG. 6 is a plan view showing a conductive assembly of the tablet detecting system shown in FIGS. 4A to 5B.

Additionally, electrical connection between the adjacent conductive assemblies 230 is made by a connection line 239. FIG. 6 shows in a plan view the conductive assemblies 230 and the connection lines 239. As shown in FIGS. 6 and 4A, the connection line 239 connects the confronting nuts 234 in the adjacent conductive assemblies 230. The connection line 239 is placed on the insulation plate 220 before the nut 234 is fastened to the cylindrical body 232.

As described above, the contact head 212 establishes an internal connection within each conductive assembly 230, and the connection line 239 does an external connection between the conductive assemblies 230. The control unit senses resultant electrical connection or disconnection and judges from the sensing result whether unacceptable tablets are contained.

Further, although not shown in the drawings, the tablet detecting system 200 may have a display unit and/or a tablet removal unit. If there is unacceptable tablet or no tablet in the loader unit, the display unit provides information to a worker via graphics, sounds, etc. and the tablet removal unit removes the unacceptable tablet from the loader unit. As described hereinbefore, the tablet detecting system of the present invention can detect minute size differences of the tablets by using a mechanical contact manner and thereby precisely distinguish unacceptable tablets. Therefore, the tablet detecting system of the invention is useful for smaller semiconductor packages.

In the drawings and specification, there have been disclosed preferred embodiments of the invention and, although specific terms are employed, they are used in a generic and descriptive sense only and not for purposes of limitation, the scope of the invention being set forth in the following claims.

What is claimed is:

1. A tablet detecting system for ascertaining whether a tablet exists in a receiving hole of a loader unit or, if exists, whether the tablet has a standard size, said system comprising:
    a push rod inserted into the receiving hole, wherein the push rod moves upward just as high as the tablet;
    a contact head formed on a top of the push rod and made of electrically conductive material;
    an insulation plate located over the contact head;
    a conductive assembly formed in the insulation plate and made of electrically conductive material; and
    a control unit electrically connected to the conductive assembly, wherein when the tablet in the receiving hole has a standard size, the contact head mechanically touches the conductive assembly and gives electrical connection to the conductive assembly, and the control unit senses the electrical connection.

2. The tablet detecting system of claim 1, wherein the conductive assembly includes a pair of conductive pads formed separately on a bottom surface of the insulation plate.

3. The tablet detecting system of claim 2, wherein the contact head has a size enough to simultaneously touch the pair of conductive pads.

4. The tablet detecting system of claim 1, wherein the conductive assembly includes a pair of cylindrical bodies each formed in the insulation plate and spaced apart from each other, a pair of plungers each inserted into the cylindrical body, and a pair of springs each interposed between the cylindrical body and the plunger so that the plunger protrudes downward from the insulation plate.

5. The tablet detecting system of claim 4, wherein the contact head has a size enough to simultaneously touch the pair of plungers.

6. A tablet detecting system for ascertaining whether a plurality of tablets are contained in respective receiving holes of a loader unit or, if contained, whether each tablet has a standard size, said system comprising:
    a plurality of push rods inserted into the respective receiving holes, wherein each push rod moves upward just as high as the tablet;
    an insulation plate located over the push rods;
    a plurality of conductive pads made of electrically conductive material and formed at regular intervals on a bottom surface of the insulation plate so that each conductive pad is electrically disconnected to each other;
    a plurality of contact heads made of electrically conductive material, each contact head formed on a top of the push rod and having a size enough to simultaneously touch a corresponding pair of the conductive pads; and
    a control unit electrically connected to both outermost conductive pads among the plurality of conductive pads,
    wherein when the tablet in the receiving hole has a standard size, the contact head mechanically touches the pair of conductive pads and gives electrical connection to the pair of conductive pads, and the control unit senses the electrical connection.

7. A tablet detecting system for ascertaining whether a plurality of tablets are contained in respective receiving holes of a loader unit or, if contained, whether each tablet has a standard size, said system comprising:
    a plurality of push rods inserted into the respective receiving holes, wherein each push rod moves upward just as high as the tablet;
    an insulation plate located over the push rods;
    a plurality of conductive assemblies made of electrically conductive material and formed at regular intervals in the insulation plate, each conductive assembly including a pair of cylindrical bodies each formed in the insulation plate and spaced apart from each other so that each cylindrical body is electrically disconnected to each other, a pair of plungers each inserted into the cylindrical body, and a pair of springs each interposed between the cylindrical body and the plunger so that the plunger protrudes downward from the insulation plate;

a plurality of contact heads made of electrically conductive material, each contact head formed on a top of the push rod and having a size enough to simultaneously touch the pair of plungers; and a control unit electrically connected to both outermost conductive assemblies among the plurality of conductive assemblies, wherein when the tablet in the receiving hole has a standard size, the contact head mechanically touches the pair of plungers and gives electrical connection to the pair of plungers, and the control unit senses the electrical connection.

* * * * *

UNITED STATES PATENT AND TRADEMARK OFFICE
CERTIFICATE OF CORRECTION

PATENT NO. : 6,782,677 B2
DATED : August 31, 2004
INVENTOR(S) : Cho et al.

It is certified that error appears in the above-identified patent and that said Letters Patent is hereby corrected as shown below:

Title page,
Item [56], References Cited, FOREIGN PATENT DOCUMENTS, should include
-- UM 0139126   07/31/97   Republic of Korea   Anam Semiconductor
   UM 0124553   01/24/97   Republic of Korea   Hyundai Electronics
   05-074828    03/26/93   Japan               Toshiba Corp.
   11-191563    07/03/99   Japan               Hitachi Ltd. --
OTHER PUBLICATIONS, should include
   -- English translation of Abstract for UM 0139126
      English translaton of Abstract for UM 0124553
      English translation of Abstract for 05-074828
      English translation of Abstract for 11-191563 --.

Signed and Sealed this

Thirty-first Day of May, 2005

JON W. DUDAS
*Director of the United States Patent and Trademark Office*